(12) United States Patent
Lukas et al.

(10) Patent No.: US 8,309,171 B1
(45) Date of Patent: Nov. 13, 2012

(54) BRIGHT NOBLE METAL PREPARATION

(75) Inventors: Annette Lukas, Rodenbach (DE); Sabine Wissel, Kahl (DE); Wiltrud Vogt, Rheinbach-Bonn (DE); Günter Werner, Hanau (DE)

(73) Assignee: Heraeus Precious Metals GmbH & Co. KG, Hanau (DE)

( * ) Notice: Subject to any disclaimer, the term of this patent is extended or adjusted under 35 U.S.C. 154(b) by 0 days.

(21) Appl. No.: 09/958,423

(22) PCT Filed: Mar. 14, 2000

(86) PCT No.: PCT/EP00/02225
§ 371 (c)(1),
(2), (4) Date: Oct. 9, 2001

(87) PCT Pub. No.: WO00/61521
PCT Pub. Date: Oct. 19, 2000

(30) Foreign Application Priority Data

Apr. 9, 1999 (DE) .................................. 199 15 937
Apr. 9, 1999 (EP) ..................................... 99107007

(51) Int. Cl.
*B05D 3/02* (2006.01)
*B05D 5/06* (2006.01)

(52) U.S. Cl. ........................................ 427/229; 427/226

(58) Field of Classification Search .................. 427/226, 427/229; 556/28, 30, 31, 57, 58, 59, 60, 556/61, 62, 63, 112, 113, 114, 115, 116, 556/117, 136, 137; 106/1.22, 1.23, 1.24, 106/1.25, 1.26, 1.27, 1.28
See application file for complete search history.

(56) References Cited

U.S. PATENT DOCUMENTS

| | | | |
|---|---|---|---|
| 3,163,665 A * | 12/1964 | Fitch | 556/113 |
| 3,216,834 A * | 11/1965 | Fitch | 106/1.28 |
| 3,266,912 A | 8/1966 | Murphy | |
| 3,962,298 A * | 6/1976 | Cukor et al. | 556/77 |
| 4,213,784 A * | 7/1980 | Ikenoue et al. | 430/616 |
| 4,231,950 A * | 11/1980 | Idelson | 556/33 |
| 4,262,040 A * | 4/1981 | Russo | 427/229 |
| 4,391,756 A * | 7/1983 | Kuch et al. | 556/14 |
| 4,418,099 A * | 11/1983 | Cuevas et al. | 427/229 |
| 4,650,108 A * | 3/1987 | Gallagher | 228/124.1 |
| 4,992,098 A | 2/1991 | Lotze et al. | |
| 5,273,947 A | 12/1993 | Ochiai | |
| 5,639,901 A * | 6/1997 | Schulz et al. | 556/113 |
| 5,885,716 A * | 3/1999 | Nagasawa et al. | 428/469 |
| 5,997,774 A * | 12/1999 | Shimizu et al. | 252/514 |
| 6,340,768 B1 * | 1/2002 | Welch et al. | 556/12 |

FOREIGN PATENT DOCUMENTS

| | | |
|---|---|---|
| CN | 1072670 | 6/1993 |
| DE | 1421865 | 3/1962 |
| DE | 37 36 583 | 11/1988 |
| DE | 41 30 106 | 3/1993 |
| EP | 296 312 | 12/1988 |
| EP | 440 877 | 11/1993 |
| JP | 47-40612 B * | 10/1972 |

OTHER PUBLICATIONS

Patent Abstracts of Japan, vol. 095, No. 004 of JP 07-014420 (May 1995).*
Page 344 of 6001 Chemical Abstracts Sep. 21, 1992, No. 12 by Chen, Shengchang, et al.
Derwent publications Ltd. XP 002105740 and JP 53 09211, Aug. 30, 1978.

* cited by examiner

*Primary Examiner* — Frederick Parker
(74) *Attorney, Agent, or Firm* — Panitch Schwarze Belisario & Nadel LLP

(57) ABSTRACT

A bright noble metal preparation for firing on ceramic/porcelain surfaces at a minimum temperature of 900° C. The preparation has at least one organic noble metal compound including at least one of an organic gold, platinum, silver, and palladium compound, at least one flux that consists of organometallic compounds including Cr in the form of at least one organic compound, such that a Cr content is 0.01 to 1.0 mole per mole of noble metal, and at least one vehicle. The bright noble metal preparation is rhodium-free and has a noble metal content of 6 to 20 wt. %, based on the preparation.

6 Claims, No Drawings

BRIGHT NOBLE METAL PREPARATION

BACKGROUND OF THE INVENTION

The invention concerns a bright noble metal preparation for application on ceramic/porcelain surfaces, especially tiles, by firing at a minimum temperature of 900° C. The preparation consists of one or more organic noble metal compounds, at least one flux that consists of organometallic compounds, and at least one vehicle.

The invention also concerns a process for producing articles, especially tiles, with decorated ceramic/porcelain surfaces by firing on a bright noble metal preparation.

Finally, the invention concerns two uses of a bright noble metal preparation of the invention.

Bright noble metal preparations for the decoration of glass, ceramics, porcelain, bone china, tiles, or other silicate substrates generally consist of solutions of organic gold, palladium, and platinum compounds in (usually organic) vehicles, synthetic or natural resins, and fluxes, which ensure good adhesion to the given substrate. Specific organometallic compounds, e.g., alcoholates, carboxylates, resinates, or sulforesinates of the elements rhodium, silver, chromium, bismuth, vanadium, silicon, etc., are used as fluxes. During firing, the organic compounds decompose to the corresponding oxides or metals, which causes the metal film to adhere to the substrate.

The bright noble metal preparations usually used for decoration are fired on ceramic, porcelain, tiles, or bone china at firing temperatures of about 780° C. to 900° C., or even as high as 1,000° C., in exceptional cases. Above this firing temperature, the adhering gold coating of bright noble metal preparations is destroyed when the gold coating recrystallizes and forms small crystals, which results in the development of a dull, brown appearance of the noble metal coating, especially in the case of a gold coating.

In recent years, there has been increasing interest in decorating ceramics and porcelain, especially tiles, by firing on color designs and transparent or opaque glass reliefs at high firing temperatures. In the case of porcelain, for example, it is customary to fire high-temperature rapid-firing glazes at about 1,200° C. in a 60-90-minute firing cycle. Tiles are fired with so-called Vetrosa effects mainly at about 980° C. to 1,060° C. These high firing temperatures are necessary to ensure sufficient fusion of the glazes or reliefs with the substrate.

Preparations that are suitable for high firing temperatures for the applications described above have very recently been developed, i.e., about 1,200° C. for porcelain or about 1,000° C. for tile decorations.

EP 0,440,877 B1 describes noble metal preparations that contain nickel and chromium resinate as fluxes and that are suitable for firing temperatures up to about 1,200° C. on porcelain.

DE 3,736,583 also describes bright noble metal preparations that can be fired at 1,250° C. on ceramic ware made of silicate materials. The flux contained in the preparation consists of an organosilicon compound with three and/or four hydrolyzable groups on the silicon atom and other organometallic compounds.

The above-described bright noble metal preparations suitable for high firing temperatures contain rhodium as one of the fluxes. It is clearly emphasized in the literature that the element rhodium is an indispensable component of bright noble metal preparations (see A. Boettcher, *Ber. D. Keram. Ges.*, Vol. 32, p. 175, 1955; S. G. Tumanov, *Steklo i Keramika*, Vol. 18, p. 26, 1961; A. A. Milgram, *J. Electrochem. Soc.*, Vol. 118, p. 287, 1971; P. A. Levin, *Steklo i Keramika*, Vol. 3, p. 36, 1968). The element rhodium is necessary during firing to prevent agglomeration and grain growth of the gold particles that are forming from the organic gold compounds. This allows the development of a uniform, reflective, bright noble metal film, especially a bright gold film. The relatively expensive rhodium-containing preparations are especially heat-resistant and stable to firing at temperatures up to 850° C.

DE 4,130,106 C2 describes a noble metal preparation that contains a greatly reduced amount of rhodium. Thorium is recommended as a substitute for the rhodium, but it is unsuitable for decorative preparations due to its radioactivity.

SUMMARY AND DESCRIPTION OF THE INVENTION

The problem presented by the above discussion is to eliminate, at least partially, the disadvantages cited above with a new type of bright noble metal preparation and a suitable process for producing it. The principal problem is to develop a bright noble metal preparation that is especially stable to firing and that produces especially intense and brilliantly lustrous noble metal films, especially gold and white-gold films, after they have been fired on ceramics, porcelain, and especially on tiles or other silicate substrates.

The bright noble metal preparation of the invention is rhodium-free and contains at least one organic gold, platinum, silver, or palladium compound and Cr in the form of at least one organic compound, such that the Cr content is 0.01 to 1.0 mole per mole of noble metal, and the content of noble metal is 6 to 20 wt. %, based on the preparation.

The core of the invention is the surprising fact that, contrary to existing theory, rhodium-free preparations solve the above-cited problem in an outstanding way, provided that the preparations contain chromium in the specified molar ratios.

Suitable noble metal compounds for the preparations of the invention include all noble metal compounds that can be dissolved or dispersed in an organic or inorganic, especially aqueous, vehicle and that thermally decompose to the given metals. In particular, resinates, sulforesinates, carboxylates, primary, secondary, or tertiary aliphatic mercaptides, aromatic mercaptides, mercaptocarboxylates, and mercaptoaminocarboxylates are suitable classes of compounds.

Suitable fluxes include basically all compounds of the non-noble metal elements specified above which can be dissolved or dispersed in the vehicle and which, regardless of their structure, decompose to the given oxides during firing. These include especially the carboxylates, resinates, sulforesinates, and alcoholates of the specified elements, but also other salts and complexes.

The preparations of the invention can be fired on ceramics and porcelain at temperatures of 900° C. to 1,300° C. and on tiles at temperatures of 900° C. to 1,100° C. in 30-90-minute firing cycles without destroying the metallic noble metal films, especially gold films. The fired noble metal films have a beautiful, bright color and excellent abrasion resistance. The preparations of the type specified above are also microwave-resistant.

The bright noble metal preparation may be directly applied by brush or screen printing to the ceramic ware to be decorated. Indirect transfer of the preparation by the metachromotype process is also possible.

Dull or satin-finish effects can also be readily achieved by adding flatting agents, such as polyethylene waxes and minerals.

Especially high firing stability can be advantageously achieved, if the Cr content is 0.05 to 0.4 mole of Cr per mole of noble metal.

To achieve especially high abrasion resistance and a modified noble metal color at the same time, it is advantageous for the preparation to contain at least one other element from the group Si and Ni in the form of organic compounds, such that the total content of Si, Cr, and Ni is 0.2 to 2.0 moles per mole of noble metal. This is especially the case, when the total content of Si, Cr, and Ni is 0.25 to 1.50 moles per mole of noble metal.

It is advantageous for the preparation to contain at least one other element from the group Cu, Co, Sn, Zr, and Bi in the form of organic compounds, such that the content of Cu, Co, Sn, Zr, and Bi is up to 0.3 mole each per mole of noble metal, since certain properties, especially color, can be modified in this way.

The preparation advantageously contains at least one other element from the group B, Al, Ca, Ti, V, Mn, Fe, Zn, Ge, Pb, Sr, Mo, Ru, In, Ba, Ta, W, Os, Ir, and Ce in the form of organic compounds, such that the content of B, Al, Ca, Ti, V, Mn, Fe, Zn, Ge, Pb, Sr, Mo, Ru, In, Rn, Ta, W, Os, Ir, and Ce is up to 0.3 mole each per mole of noble metal, since the luster and color properties can be readily modified in this way.

In addition, it is especially advantageous for the noble metal content to be 6 to 14 wt. %, based on the preparation, since especially high-effect metal films can be produced with a noble metal content in this range, and since, in addition, this range is more economical with respect to noble metal consumption.

Finally, it is advantageous for the bright noble metal preparation of the invention to contain no thorium, so that the preparation is not radioactive and is thus safe to use for producing decorative designs.

In the process of the invention for producing articles with decorated ceramic/porcelain surfaces, especially tiles, by firing a bright noble metal preparation applied to the surface of the articles, first a bright noble metal preparation of the invention is applied to a suitable surface of an article, and then the article is fired at a temperature of 900° C. to 1,300° C.

The articles produced and decorated in accordance with the invention have the surprising and advantageous properties specified above, especially an intense noble metal film luster.

EXAMPLES

The following examples serve to illustrate the invention.

Example 1

A bright gold preparation with the following composition:
gold sulforesinate (54% Au) 18.5 wt. %
chromium resinate (10% Cr) 5.0 wt. %
silicon resinate dissolved
in pine oil (10% Si) 5.0 wt. %
nickel resinate (10% Ni) 5.0 wt. %
sulfurated oil of turpentine 30.0 wt. %
xylene 15.0 wt. %
pine oil 21.5 wt. %
is applied with a brush on porcelain plates, bone china plates, or tiles and fired under firing conditions similar to those described in Example 2. A brilliant, golden yellow, highly abrasion-resistant gold film forms.

The resulting decorative design is microwave-resistant. It was re-peatedly exposed to 700 W of power for periods of 15 minutes in a microwave oven, but showed no sparking or other damage.

To produce tiles with decorative designs, the preparation is applied to the tiles by screen printing and fired at 1,050° C. A brilliant, golden yellow, crack-free gold film with strong resistance to abrasion is formed.

Example 2

A bright gold preparation with the following composition:
gold sulforesinate (54% Au) 18.5 wt. %
chromium resinate (10% Cr) 5.0 wt. %
silicon resinate in pine
oil (10,% Si) 5.0 wt. %
nickel resinate (10% Ni) 5.0 wt. %
sulfurated oil of turpentine 30.0 wt. %
pine oil 26.5 wt. %
sulfurated damar 10.0 wt. %
is applied by screen printing on porcelain plates or bone china plates and then fired at 1,200° C. and 900° C., respectively.

A brilliant, golden yellow, strongly adhering gold film forms. The decorative design is microwave-resistant. It was repeatedly exposed to 700 W of power for periods of 15 minutes in a microwave oven, but showed no sparking or other damage.

To produce tiles with decorative designs, the preparation is applied on the tiles by screen printing and then fired at 1,050° C. A brilliant, golden yellow, crack-free gold film with strong resistance to abrasion is formed.

The invention claimed is:

1. A process for producing a decorative coating on a surface of a porcelain or ceramic article comprising the steps of:
  preparing a rhodium-free noble metal preparation of at least one organic noble metal compound including an organic gold compound, at least one flux that consists of organometallic compounds, including Cr in the form of at least one organic compound, such that a Cr content is 0.01 to 1.0 mole per mole of noble metal, and at least one vehicle, wherein the bright noble metal preparation has a noble metal content of 6 to 20 wt. % based on the preparation and at least one other element selected from the group consisting of Si and Ni in the form of organic compounds, such that a total content of Si, Cr, and Ni is 0.2 to 2.0 moles per mole of noble metal;
  applying the preparation on the surface of porcelain or a tile; and
  firing the noble metal preparation at a temperature of 900° C. to 1300° C. to produce a bright decorative coating on the surface of the ceramic or porcelain article.

2. The process in accordance with claim 1, wherein the Cr content is 0.05 to 0.4 mole per mole of noble metal.

3. The process in accordance with claim 1, wherein the total content of Si, Cr, and Ni is 0.25 to 1.50 mole per mole of noble metal.

4. The process in accordance with claim 1, wherein the preparing step includes preparing a noble metal preparation further including at least one other element selected from the group consisting of Cu, Co, Sn, Zr, and Bi in the form of organic compounds, such that a content of Cu, Co, Sn, Zr, and Bi is up to 0.3 mole each per mole of noble metal.

5. The process in accordance with claim 1, wherein the preparing step includes preparing a noble metal preparation further including at least one other element selected from the group consisting of B, Al, Ca, Ti, V, Mn, Fe, Zn, Ge, Pb, Sr, Mo, Ru, In, Ba, Ta, W, Os, Ir, and Ce in the form of organic compounds, such that a content of B, Al, Ca, Ti, V, Mn, Fe, Zn, Ge, Pb, Sr, Mo, Ru, In, Ba, Ta, W, Os, Ir, and Ce is up to 0.3 mole each per mole of noble metal.

6. The process in accordance with claim 1, wherein the noble metal content is 6 to 14 wt. % based on the preparation.

* * * * *